US009811045B2

(12) United States Patent
Shiraishi et al.

(10) Patent No.: US 9,811,045 B2
(45) Date of Patent: Nov. 7, 2017

(54) IMAGE FORMING APPARATUS, METHOD FOR CONTROLLING IMAGE FORMING APPARATUS, AND NON-TRANSITORY COMPUTER READABLE MEDIUM FOR CONTROLLING SUPPLY OF ELECTRIC POWER

(71) Applicant: FUJI XEROX CO., LTD., Tokyo (JP)

(72) Inventors: Keiko Shiraishi, Ebina (JP); Kazuhiko Narushima, Yokohama (JP); Koichi Azuma, Yokohama (JP); Hidenori Horie, Yokohama (JP); Kenji Kuroishi, Yokohama (JP); Masafumi Ono, Yokohama (JP); Yuri Takeuchi, Yokohama (JP); Riwako Miyauchi, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/214,153

(22) Filed: Jul. 19, 2016

(65) Prior Publication Data
US 2017/0235271 A1   Aug. 17, 2017

(30) Foreign Application Priority Data

Feb. 15, 2016 (JP) .................................. 2016-025934

(51) Int. Cl.
*G03G 15/00* (2006.01)
*H04N 1/00* (2006.01)
*G03G 15/20* (2006.01)

(52) U.S. Cl.
CPC ......... *G03G 15/80* (2013.01); *G03G 15/2017* (2013.01); *H04N 1/00888* (2013.01)

(58) Field of Classification Search
CPC ..... G03G 15/50; G03G 15/80; G03G 15/2017
USPC ...................................... 399/75, 88
See application file for complete search history.

(56) References Cited

U.S. PATENT DOCUMENTS

| | | | |
|---|---|---|---|
| 9,088,682 B2 * | 7/2015 | Ono et al. ............. | G03G 15/50 |
| 9,288,354 B2 * | 3/2016 | Hirose ............... | H04N 1/00323 |
| 9,547,267 B2 * | 1/2017 | Baba et al. ......... | G03G 15/5004 |
| 9,600,054 B2 * | 3/2017 | Ono et al. ............. | G06F 1/3231 |
| 2006/0173561 A1 | 8/2006 | Aoki | |
| 2015/0022840 A1 | 1/2015 | Yamada et al. | |

FOREIGN PATENT DOCUMENTS

| | | |
|---|---|---|
| JP | 2006-211561 A | 8/2006 |
| JP | 2015-022646 A | 2/2015 |

* cited by examiner

*Primary Examiner* — William J Royer
(74) *Attorney, Agent, or Firm* — Oliff PLC (57) ABSTRACT

An image forming apparatus includes: a communication unit that receives first mode electric power to perform communication; an image forming unit that receives first mode electric power to form an image on a medium; a fixing unit that generates heat by receiving first mode electric power, and performs a fixing process of fixing the image to the medium; a predicting unit that predicts a processing time required for a process of forming the image; and a supply controller that controls supply of electric power according to a first mode or a second mode in which power consumption is smaller than that of the first mode. The supply controller starts the supply of first mode electric power to the fixing unit at a timing based on the predicted processing time when the image forming apparatus transitions from the second mode to the first mode.

6 Claims, 8 Drawing Sheets

IMAGE FORMING APPARATUS, METHOD FOR CONTROLLING IMAGE FORMING APPARATUS, AND NON-TRANSITORY COMPUTER READABLE MEDIUM FOR CONTROLLING SUPPLY OF ELECTRIC POWER

CROSS-REFERENCE TO RELATED APPLICATIONS

This application is based on and claims priority under 35 USC 119 from Japanese Patent Application No. 2016-025934 filed on Feb. 15, 2016.

BACKGROUND

1. Technical Field

The present invention relates to an image forming apparatus, a method for controlling an image forming apparatus, and a non-transitory computer readable medium.

2. Related Art

An information processing apparatus having a mode in which minimum necessary functions (devices) only are operated and other functions are stopped as a power-saving mode has become popular.

SUMMARY

According to an aspect of the present invention, there is provided an image forming apparatus including: a communication unit that receives supply of electric power corresponding to a first mode to perform communication via a communication line; an image forming unit that receives supply of electric power corresponding to the first mode to form an image, corresponding to image data acquired via the communication line, on a medium; a fixing unit that includes a heat source that generates heat by receiving supply of electric power corresponding to the first mode, and performs a fixing process of fixing the image to the medium using the heat generated by the heat source; a predicting unit that predicts a processing time required for a process of forming the image; and a supply controller that controls supply of electric power in an own apparatus according to the first mode or a second mode in which power consumption is smaller than that of the first mode, the supply controller starting the supply of electric power corresponding to the first mode to the heat source at a timing based on the predicted processing time when the image forming apparatus transitions from the second mode to the first mode.

BRIEF DESCRIPTION OF THE DRAWINGS

Exemplary embodiments of the present invention will be described in detail based on the following figures, wherein.

DETAILED DESCRIPTION

An exemplary embodiment of the invention will be described with reference to the drawings.

Figure 1:
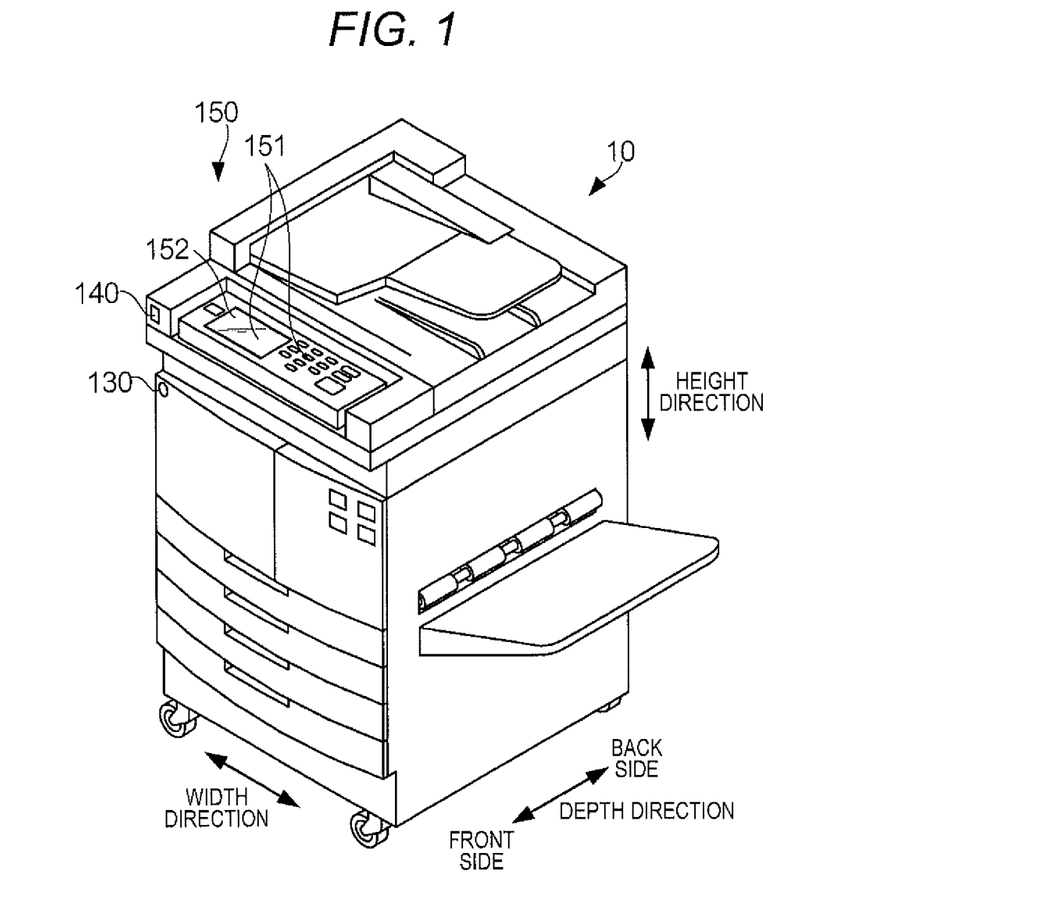
FIG. 1 is a perspective view illustrating an outer configuration of an image forming apparatus according to an exemplary embodiment of the invention.

FIG. 1 is a perspective view illustrating an outer configuration of an image forming apparatus 10 according to an exemplary embodiment of the invention. As illustrated in FIG. 1, the image forming apparatus 10 is a console-type image forming apparatus. The image forming apparatus 10 has a so-called pull printing function of accessing a storage location instructed by a user to acquire image data and executing a process of forming an image on a medium such as a sheet based on the image data. The user of the image forming apparatus 10 uses a user interface 150 while standing in front of the image forming apparatus 10. Specifically, the user operates an operating unit 151 and views an image on a display 152.

Moreover, the image forming apparatus 10 includes a pyroelectric sensor 130 and a reflection sensor 140 as a configuration for detecting the presence of a person present on the front side thereof. The pyroelectric sensor 130 and the reflection sensor 140 are provided to detect the presence of a person who is likely to use the image forming apparatus 10.

Figure 2:
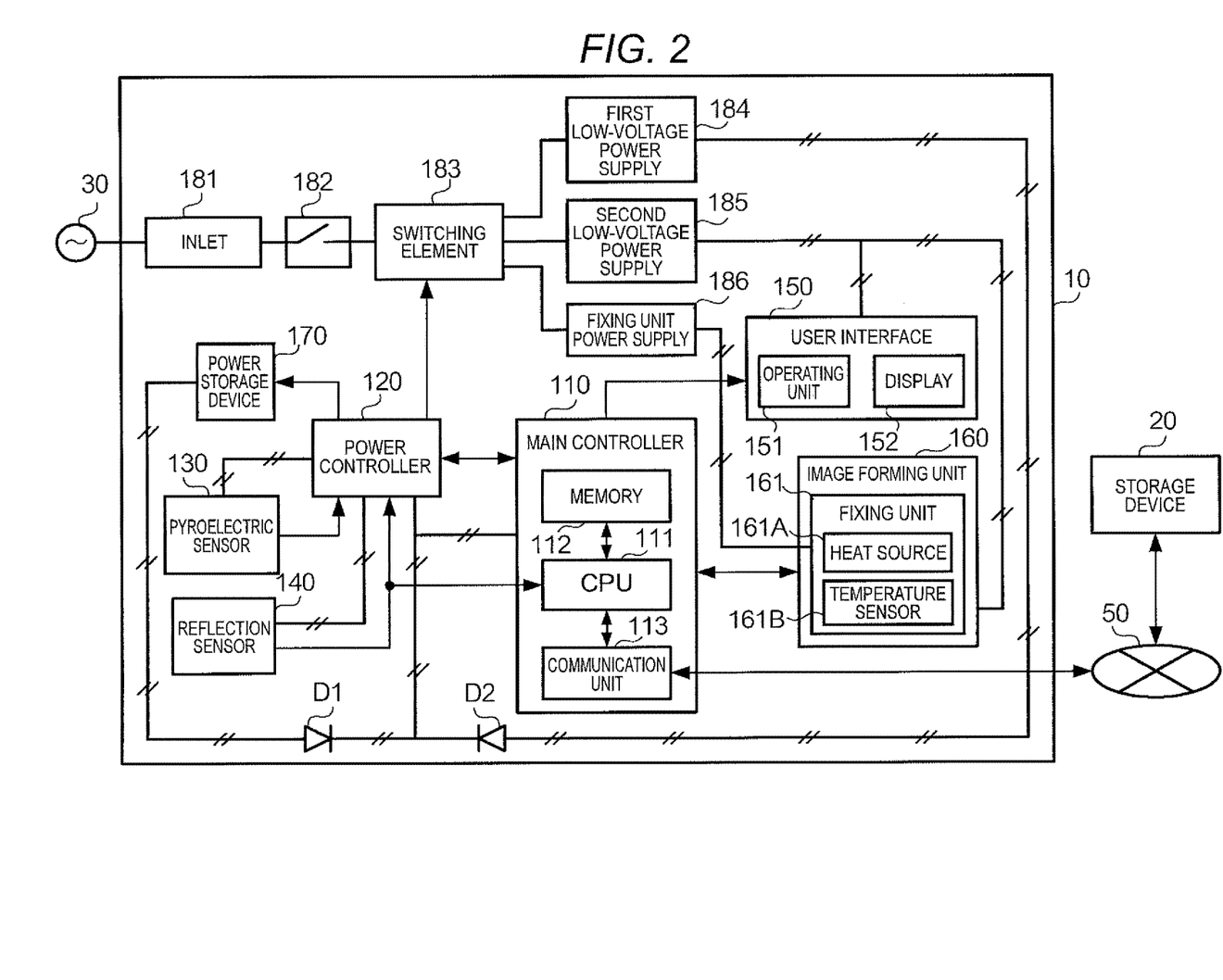
FIG. 2 is a block diagram illustrating a hardware configuration of the image forming apparatus.

FIG. 2 is a block diagram illustrating a hardware configuration of the image forming apparatus 10. As illustrated in FIG. 2, the image forming apparatus 10 includes a main controller 110, a power controller 120, the pyroelectric sensor 130, the reflection sensor 140, the user interface 150, an image forming unit 160, a power storage device 170, an inlet 181, a main switch 182, a switching element 183, a first low-voltage power supply 184, a second low-voltage power supply 185, and a fixing unit power supply 186. In FIG. 2, arrows indicated by solid lines connecting blocks indicate the flow of signals and solid lines without arrows indicate the flow (power feeding wires) of electric power.

The main controller 110 includes a central processing unit (CPU) 111, a memory 112, and a communication unit 113. The memory 112 includes a read only memory (ROM) and a random access memory (RAM), for example. The CPU 11 controls the respective units of the image forming apparatus 10 by reading a program stored in the ROM of the memory 112 or an auxiliary storage device (for example, a hard disk drive) (not illustrated) into the RAM of the memory 112 and executing the program. The communication unit 113 includes a modem, for example, and performs communication via a communication line 50 (the communication unit 113 is an example of a communication unit). The communication unit 113 communicates with a storage device 20 connected to the communication line 50. The communication line 50 is a public communication line (communication network) such as the Internet.

The storage device 20 is a device that stored image data. In the present exemplary embodiment, the image data is image data of the page description language (PDL) format. In order to distinguish the image data of the PDL format from image data of a raster format described later, the former will be referred to as "PDL data" and the latter will be referred to as "raster data". The storage device 20 is a device such as a personal computer (PC) used by an individual. In this case, the storage device 20 stores the PDL data managed by the individual. The storage device 20 may be a device (for example, a server device or an image forming apparatus) that stores the PDL data managed by plural persons.

The power controller 120 includes an application specific integrated circuit (ASIC), for example, and performs control of supplying power to the respective units of the image forming apparatus 10 according to plural modes. In the present exemplary embodiment, the mode includes a "process execution mode," a "standby mode," a "sleep mode," and a "sleep-zero mode". The power consumption (power consumption amount) of the image forming apparatus 10 increases in the order of "process execution mode">"standby mode">"sleep mode">"sleep-zero mode". In other words, in the image forming apparatus 10, the number of hardware circuits of which a part or all of the functions is stopped increases in the order of "sleep-zero mode">"sleep mode">"standby mode">"process execution mode". The details of the respective modes will be described later.

The pyroelectric sensor 130 is a passive infrared human detection sensor having a pyroelectric element. The reflection sensor 140 is an infrared sensor in this example and is configured such that a photodetector detects reflected light which is emitted from an emitter and is reflected from the surface of a subject (that is, a person). It is assumed that the reflection sensor 140 consumes a larger amount of power than the pyroelectric sensor 130.

The pyroelectric sensor 130 is an example of a first detector and the reflection sensor 140 is an example of a second detector.

Figure 3:
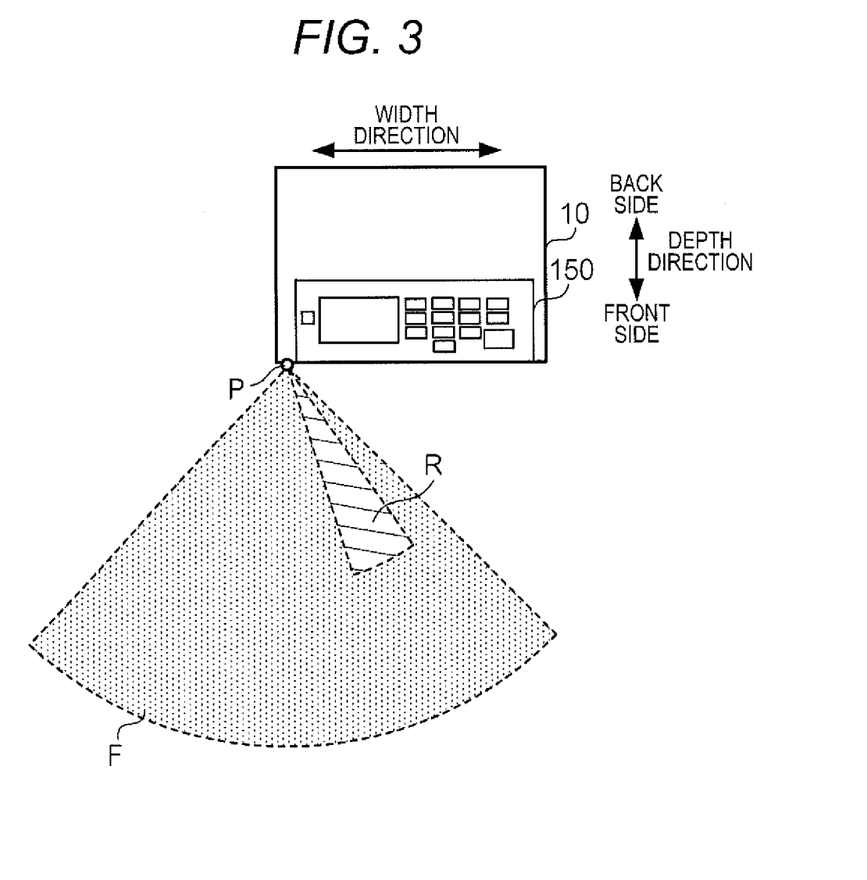
FIG. 3 is a diagram illustrating a range in which the presence of a person is detected by the image forming apparatus.

FIG. 3 is a diagram illustrating a range in which the presence of a person is detected by the image forming apparatus 10. In FIG. 3, the image forming apparatus 10 and the surrounding are seen from above in the height direction of the image forming apparatus 10.

As illustrated in FIG. 3, a first detection range F of the pyroelectric sensor 130 is formed on the front side of the image forming apparatus 10 and is approximately fan-shaped. When a person approaches the image forming apparatus 10 or the person passes across the image forming apparatus 10, the person may enter into the first detection range F. The first detection range F is an example of the range of "first distance" from the image forming apparatus 10. In this example, a position which is indicated by symbol "P" in FIG. 3 and in which the pyroelectric sensor 130 is disposed will be regarded as the position of the image forming apparatus 10.

A second detection range R illustrated in FIG. 3 is formed on the front side of the image forming apparatus 10 and is approximately triangular. The second detection range R is entirely included in the first detection range F and the angle of a corner including the apex located at the position P is smaller than that of the first detection range F. The second detection range R is an example of the range of "second distance" from the image forming apparatus 10 and is the range of distance closer to the image forming apparatus 10 than the first detection range F. A person who uses the image forming apparatus 10 enters into the second detection range R.

The description will be continued by returning to FIG. 2.

The user interface 150 is a unit that implements interaction with users and includes the operating unit 151 that receives operations input by users and the display 152 that displays images. The operating unit 151 includes an operator such as, for example, a physical key or a touch sensor (for example, a resistive film-type or electrostatic capacitance-type touch sensor). The operating unit 151 receives an instruction to execute an image forming process according to an operation of a user (the operating unit 151 is an example of a receiving unit). The display 152 includes a liquid crystal panel and a liquid crystal driving circuit, for example. The display 152 displays an image for receiving user's operations including the instruction to execute the image forming process (the display 152 is an example of a display).

The image forming unit 160 is an electrophotographic printer, for example, and performs a forming process of forming an image corresponding to image data on a medium such as a sheet and a fixing process of fixing the formed image to the medium. The forming process includes a process of irradiating an image carrier such as a photoconductor with a laser beam to form a latent image, developing the latent image with toner of respective colors of yellow (Y), magenta (M), cyan (C), and black (K), and transferring the toner images to a medium such as a recording sheet. The fixing process is a process of fixing the images to the medium by heating the images formed on the medium.

The image forming unit 160 includes a fixing unit 161 for performing the fixing process. More specifically, the fixing unit 161 includes a heat source 161A and a temperature sensor 161B, and the heat source 161A is a heater (for example, a halogen lamp, an IH heater, or the like) and is a heat source that generates heat by receiving the supply of electric power. Although the heat source 161A is a heat source that is over-heated by induction heating, for example, heat sources of other types may be used. The fixing unit 161 performs a fixing process using the heat generated by the heat source 161A. The temperature sensor 161B is a sensor that measures the temperature of the heat source 161A and is an example of a temperature measurement unit. The temperature sensor 161B supplies temperature data indicating the measured temperature to the main controller 110 (the CPU 111).

The power storage device 170 has the function of a battery that stores electric power. In the sleep-zero mode, the power storage device 170 is connected to a rectifying element D1 via a power feeding wire to supply electric power to the power controller 120, a portion of the main controller 110, and the pyroelectric sensor 130. Although not illustrated in the drawing, the power storage device is configured to be able to be charged by a low-voltage power supply or the like.

The image forming apparatus 10 receives electric power from a commercial power supply 30 by being connected to the commercial power supply 30 via the inlet 181. The inlet 181 is connected to one end of the main switch 182. The other end of the main switch 182 is connected to the first low-voltage power supply 184, the second low-voltage power supply 185, and the fixing unit power supply 186 via the switching element 183. The switching element 183 is configured as a semiconductor element such as a triac and switches the connection (that is, a power supply path) between the commercial power supply 30 and each of the first low-voltage power supply 184 and the second low-voltage power supply 185.

The switching element 183 is configured to switch the connection to the commercial power supply 30, of the first low-voltage power supply 184, the second low-voltage power supply 185, and the fixing unit power supply 186 independently.

The first low-voltage power supply 184 supplies electric power (for example, a power supply voltage of 5 V) to components to which the supply of electric power is not to be stopped in the sleep mode, such as the main controller 110, the power controller 120, the reflection sensor 140, and the pyroelectric sensor 130, based on the commercial power supply 30. The second low-voltage power supply 185 supplies electric power (for example, a power supply voltage of 24 V and 5 V) to the user interface 150 and the image forming unit 160 based on the commercial power supply 30. The fixing unit power supply 186 supplies electric power (for example, a power supply voltage of 100 V) for heating the heat source 161A of the fixing unit 161 based on the commercial power supply 30.

The image forming apparatus 10 may further include constituent elements equivalent to those of a general image forming apparatus, such as an image reading unit for reading an image of an original document or the like and a facsimile communication unit for performing facsimile communication in addition to the above-described constituent elements.

In the image forming apparatus 10 having such a configuration, the "process execution mode" is a mode in which the image forming apparatus 10 executes processing (for example, an image forming process). In the "process execution mode (an example of a first mode)," electric power is supplied to all hardware circuits described in FIG. 2, and each hardware circuit operates by receiving the supply of electric power. In the "standby mode," electric power is supplied to all hardware circuits described in FIG. 2 similarly to the "process execution mode". However, since processing is not being executed, it is assumed that the power consumed by the image forming apparatus 10 is smaller than that in the "process execution mode". In the "process execution mode" and the "standby mode," the first and second low-voltage power supplies 184 and 185 supply electric power. On the other hand, it is assumed that the supply of electric power from the power storage device 170 and the fixing unit power supply 186 is interrupted (stopped).

The "sleep mode" is a mode in which the first low-voltage power supply 184 supplies electric power to the power controller 120, a portion of the main controller 110, the pyroelectric sensor 130, and the reflection sensor 140 and the supply of electric power from the second low-voltage power supply 185 and the fixing unit power supply 186 is interrupted. In other words, in the sleep mode, although the power controller 120, a portion of the main controller 110, the pyroelectric sensor 130, and the reflection sensor 140 are operating, the other hardware circuits illustrated in FIG. 2 are not operating. For example, the communication unit 113 suspends a monitoring function of monitoring the communication line 50 and does not transmit and receive data via the communication line 50. Moreover, it is assumed that the supply of electric power from the power storage device 170 is interrupted. Although not illustrated in the drawing, a main power supply unit can save electricity consumed in the apparatus.

The "sleep-zero mode" is a mode (an example of a second mode) in which the supply of electric power from the first low-voltage power supply 184, the second low-voltage power supply 185, and the fixing unit power supply 186 is interrupted. In the sleep-zero mode, the power storage device 170 supplies electric power to the power controller 120 and the pyroelectric sensor 130. In other words, in the sleep-zero mode, although the power controller 120 and the pyroelectric sensor 130 are operating, the other hardware circuits illustrated in FIG. 2 are not operating. The communication unit 113 stops the monitoring function of the communication line 50.

In the "sleep mode" and the "sleep-zero mode," at least the function of the power controller 120 switching the switching element 183 may be operating, and all functions may not need to be operating. Moreover, the switching function of the power controller 120 may be separated as an independent functional unit.

Figure 4:
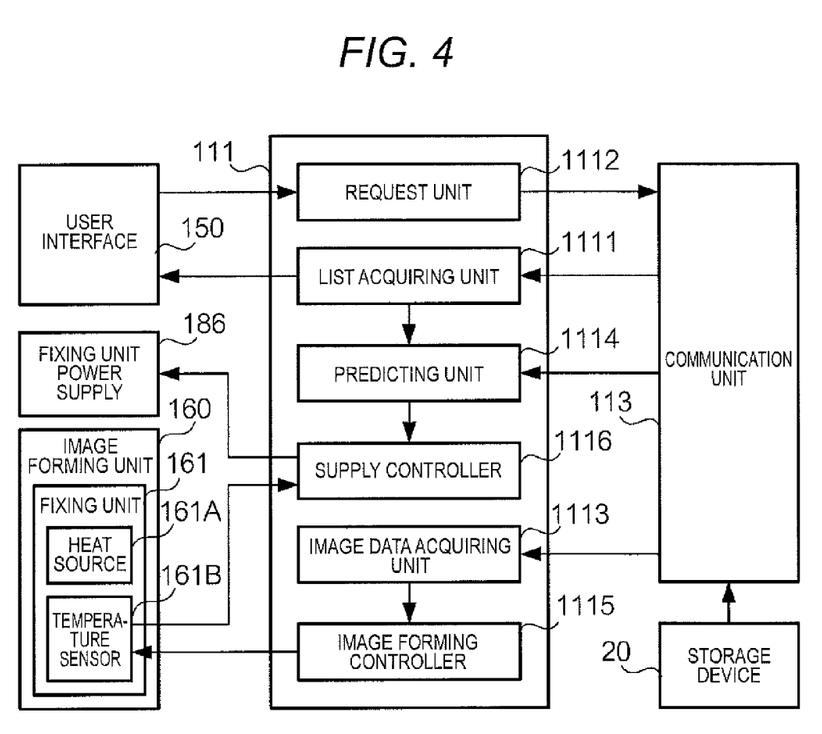
FIG. 4 is a block diagram illustrating a functional configuration of a CPU of the image forming apparatus.

FIG. 4 is a block diagram illustrating a functional configuration of the CPU 111. The CPU 111 executes a program to thereby realize functions corresponding to a list acquiring unit 1111, a request unit 1112, an image data acquiring unit 1113, a predicting unit 1114, an image forming controller 1115, and a supply controller 1116.

The list acquiring unit 1111 is an example of a list acquiring unit that acquires a list (hereinafter referred to as a "process list") indicating a list of image forming processes. The list acquiring unit 1111 acquires a process list from the storage device 20 via the communication unit 113 in the process execution mode. The process list includes information on the image forming process such as a data amount, the number of pages, and a color (color/monochrome) of each item of PDL data which is the target of the image forming process.

It is assumed that the process list does not include the PDL data itself. Moreover, the list acquiring unit 1111 acquires the process list before the PDL data is acquired from the storage device 20.

The request unit 1112 is an example of a request unit that requests the storage device 20 to acquire PDL data via the communication unit 113 in the process execution mode. For example, the request unit 1112 requests the storage device 20 to acquire PDL data selected by a user from the process list.

The image data acquiring unit 1113 is an example of an image data acquiring unit that acquires the PDL data transmitted from the storage device 20 via the communication unit 113 according to the request of the request unit 1112 in the process execution mode.

The predicting unit 1114 is an example of a predicting unit that predicts a processing time which is the time required for the forming process corresponding to the PDL data acquired by the image data acquiring unit 1113 in the process execution mode. It is assumed that the processing time does not include the time required for the fixing process. The predicting unit 1114 predicts the processing time based on the communication speed of the communication line 50 and the respective items of information such as the data amount, the number of pages, and color (color/monochrome) registered in the process list acquired by the list acquiring unit 1111. More specifically, the processing time is the sum of the time required for the process of acquiring the PDL data from the storage device 20 and the time required for the process (in the present exemplary embodiment, a decomposing process) for generating raster data from the PDL data.

The image forming controller 1115 performs control for causing the image forming unit 160 to form an image corresponding to the PDL data acquired by the image data acquiring unit 1113 in the process execution mode. Specifically, the image forming controller 1115 performs decomposing based on the PDL data to generate raster data, supplies the generated raster data to the image forming unit 160, and causes the image forming unit 160 to perform the forming process and the fixing process.

The supply controller 1116 is an example of a supply controller that controls the supply of electric power in the image forming apparatus 10 according to any one of the plural modes described above. For example, when the mode transitions from the sleep-zero mode to the process execution mode, the supply controller 1116 starts the supply of electric power corresponding to the process execution mode to the heat source 161A at the timing corresponding to the processing time predicted by the predicting unit 1114. When the supply of electric power corresponding to the process execution mode to the heat source 161A starts, heating of the heat source 161A starts. Hereinafter, the timing at which the supply of electric power corresponding to the process execution mode to the heat source 161A starts is sometimes referred to as "ON timing". The supply controller 1116 starts the supply of electric power at the timing at which the temperature of the heat source 161A reaches a fixing temperature at least until the fixing process starts (in the present exemplary embodiment, at the time point at which the forming process starts). The fixing temperature is a predetermined temperature and is the temperature of the heat source 161A when the fixing process is performed.

Next, the operation of the present exemplary embodiment will be described.

Figure 5:
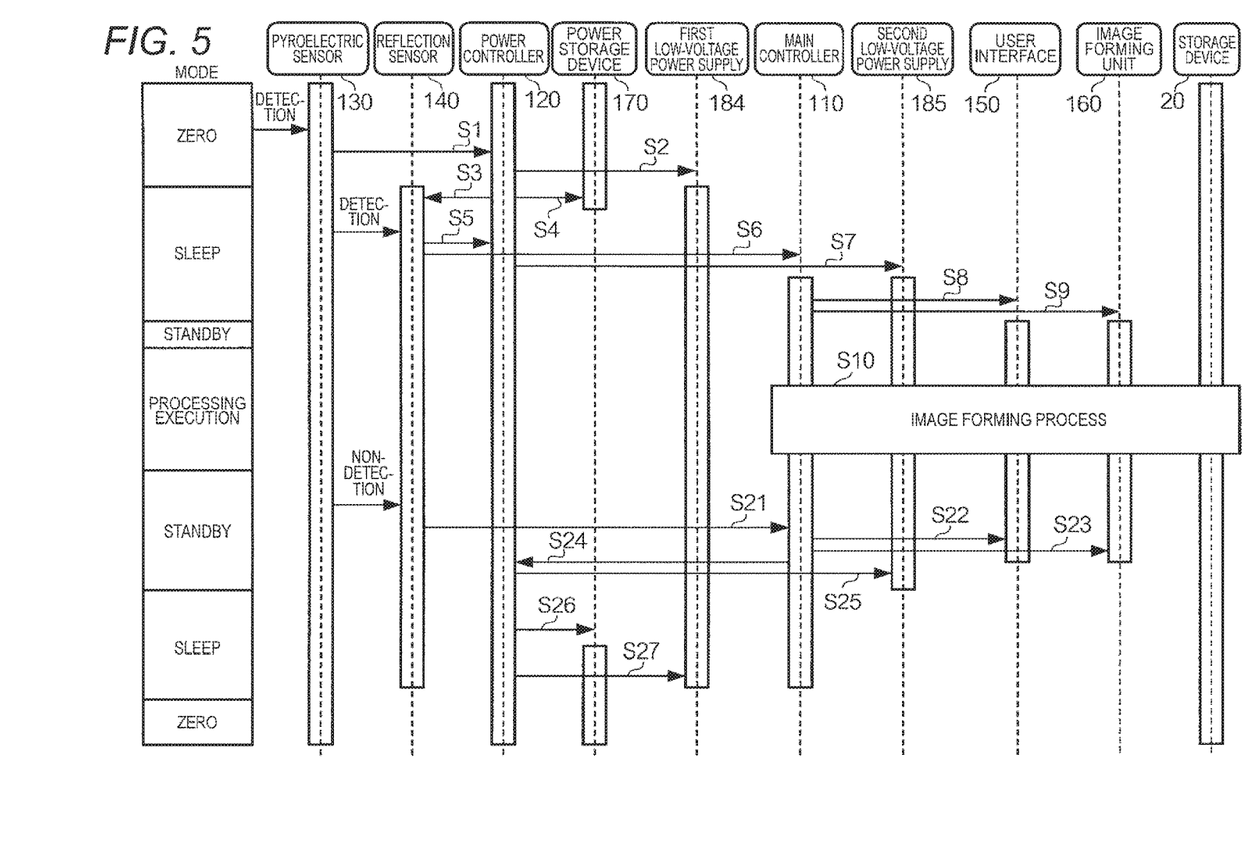
FIG. 5 is a sequence chart illustrating the flow of an overall process executed by the image forming apparatus.

FIG. 5 is a sequence chart illustrating the process executed by the image forming apparatus 10. FIG. 5 also illustrates a temporal change in the mode of the image forming apparatus 10. FIGS. 6A to 6C and FIG. 9 are diagrams illustrating the change in the position of a person present around the image forming apparatus 10.

As described above, the power controller 120 controls the turning ON/OFF of the switching element 183 to control the connection between the commercial power supply 30 and each of the first low-voltage power supply 184, the second low-voltage power supply 185, and the fixing unit power supply 186. In FIG. 5 and FIGS. 6A to 6C, the control is illustrated by arrows connecting the power controller 120 and the first low-voltage power supply 184, the second low-voltage power supply 185, and the fixing unit power supply 186.

Moreover, it is assumed that the image forming apparatus 10 operates in the sleep-zero mode at the time point at which the process described later starts. That is, the image forming apparatus 10 is in a state in which the pyroelectric sensor 130, a portion of the main controller 110, and the power controller 120 only are operated using the power storage device 170 as a power supply. On the other hand, the switching element 183 is turned off, and the first low-voltage power supply 184, the second low-voltage power supply 185, and the fixing unit power supply 186 are disconnected from the commercial power supply 30. In this case, it can be said that the power consumption of the image forming apparatus 10 based on the commercial power supply 30 is zero.

Figure 6A:
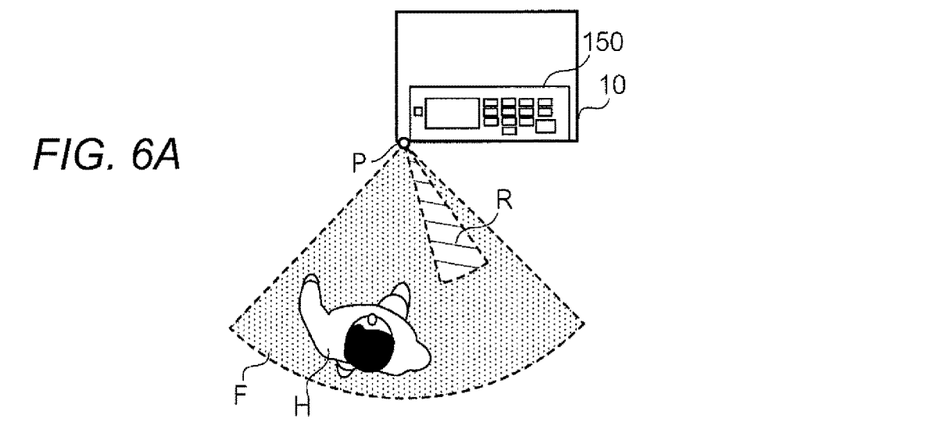
FIGS. 6A to 6C are diagrams illustrating the change in the position of a person present around the image forming apparatus.

In the sleep-zero mode, the image forming apparatus 10 detects whether a person is present in the first detection range F with the aid of the pyroelectric sensor 130. As illustrated in FIG. 6A, when a person H enters into the first detection range F, the pyroelectric sensor 130 supplies a detection signal indicating the entrance to the power controller 120 (step S1).

When the detection signal is supplied from the pyroelectric sensor 130, the power controller 120 turns the switching element 183 on so that the commercial power supply 30 is connected to the first low-voltage power supply 184 (step S2). By the process of step S2, the image forming apparatus 10 transitions from the sleep-zero mode to the sleep mode. When the sleep mode starts, the first low-voltage power supply 184 supplies electric power to the main controller 110, the power controller 120, the pyroelectric sensor 130, and the reflection sensor 140 via a rectifying element D2 based on the commercial power supply 30. The reflection sensor 140 receives the electric power from the first low-voltage power supply 184 and starts detecting the presence of a person in the second detection range R according to an instruction (step S3) from the power controller 120.

When the supply of electric power by the first low-voltage power supply 184 starts (that is, when the sleep mode starts), the power controller 120 supplies an interrupt instruction signal instructing the power storage device 170 to interrupt the supply of electric power to the power storage device 170 (step S4). When the interrupt instruction signal is supplied, the power storage device 170 stops the supply of electric power.

The process of step S4 may be performed after the start of the supply of electric power by the first low-voltage power supply 184 is checked and may be performed after a predetermined period has elapsed from the process of step S2.

Figure 6B:
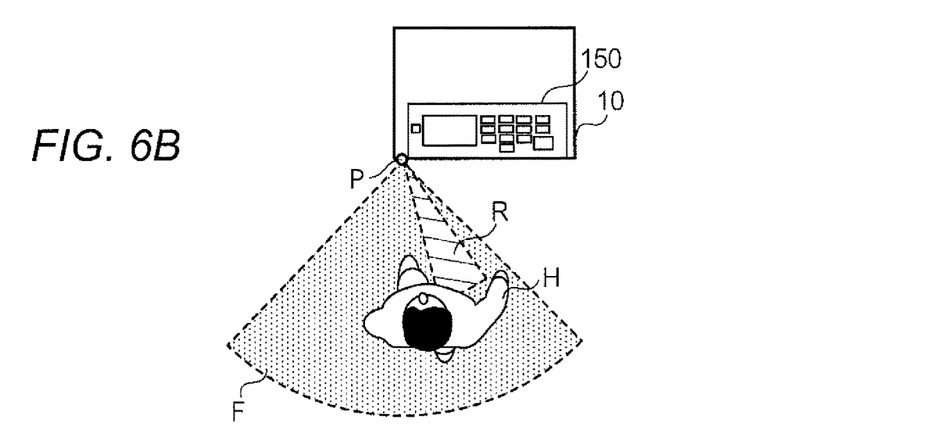

Subsequently, as illustrated in FIG. 6B, it is assumed that the person H enters into the second detection range R. The reflection sensor 140 supplies a detection signal indicating the entrance to the power controller 120 and the main controller 110 (steps S5 and S6). When the detection signal is supplied from the reflection sensor 140, the main controller 110 operates by receiving the supply of electric power from the first low-voltage power supply 184. Further, the communication unit 113 also operates by receiving the supply of electric power from the first low-voltage power supply 184. That is, the communication unit 113 activates the monitoring function of the communication line 50 and transmits and receives data via the communication line 50.

When the detection signal is supplied from the reflection sensor 140, the power controller 120 turns the switching element 183 on so that the commercial power supply 30 is connected to the second low-voltage power supply 185 (step S7). With the process of step S7, the second low-voltage power supply 185 starts the supply of electric power to the user interface 150 and the image forming unit 160 (steps S8 and S9). The user interface 150 and the image forming unit 160 operate by receiving the supply of electric power from the second low-voltage power supply 185. Specifically, the operating unit 151 starts receiving the operations of a user. The display 152 starts displaying an image (for example, a menu screen) for receiving the user's operation. The image forming unit 160 enters a state in which the image forming process can be executed.

At this time, it is assumed that the heat source 161A of the fixing unit 161 is not heated.

With the above-described process, all hardware circuits illustrated in FIG. 2, of the image forming apparatus 10 operate whereby the image forming apparatus 10 transitions from the sleep mode to the standby mode.

Subsequently, the main controller 110 executes the image forming process (step S10). The image forming process is a process including the forming process and the fixing process described above.

Figure 7:
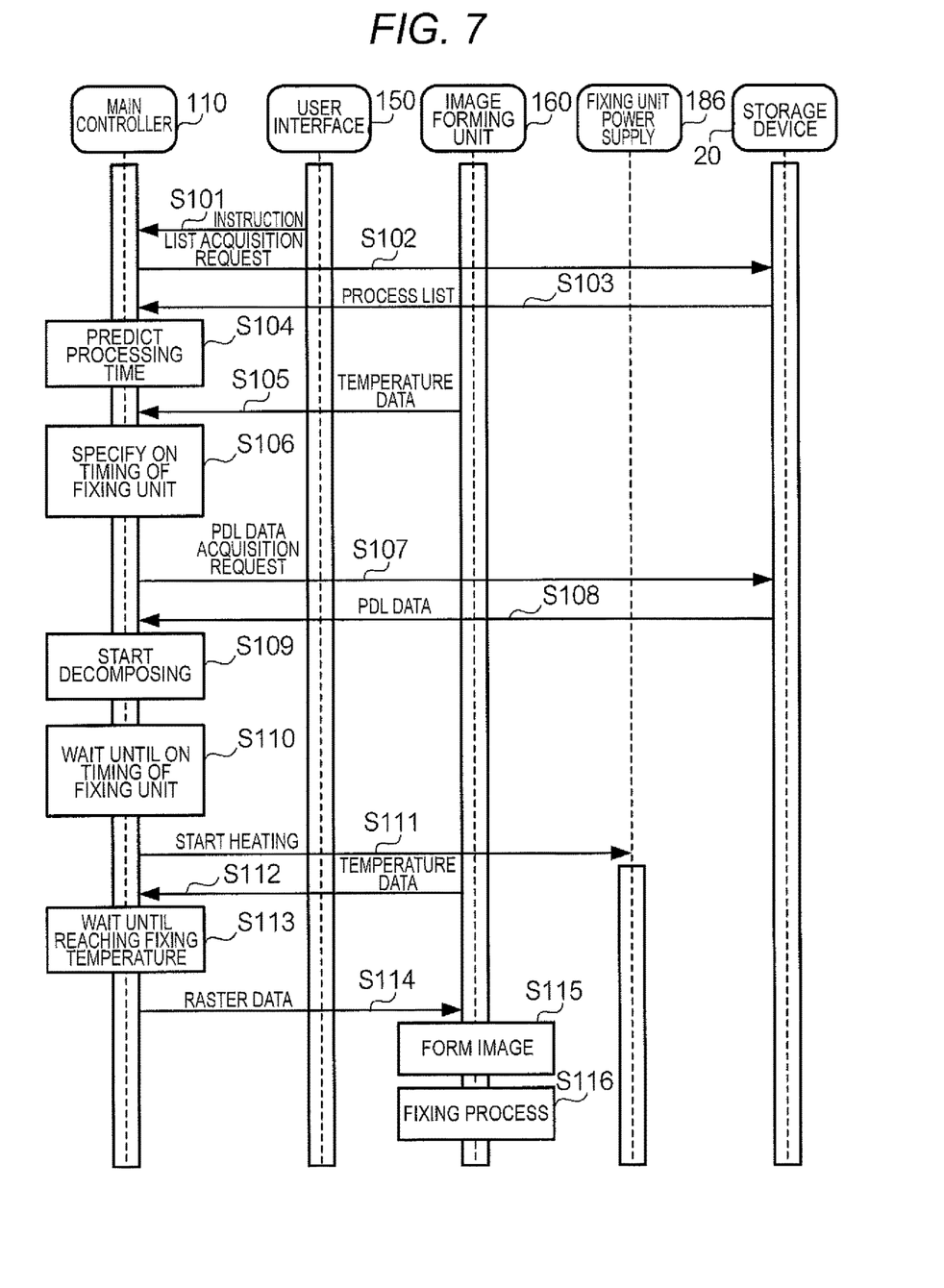
FIG. 7 is a sequence chart illustrating the flow of an image forming process executed by the image forming apparatus.

FIG. 7 is a sequence chart illustrating the image forming process.

Figure 6C:
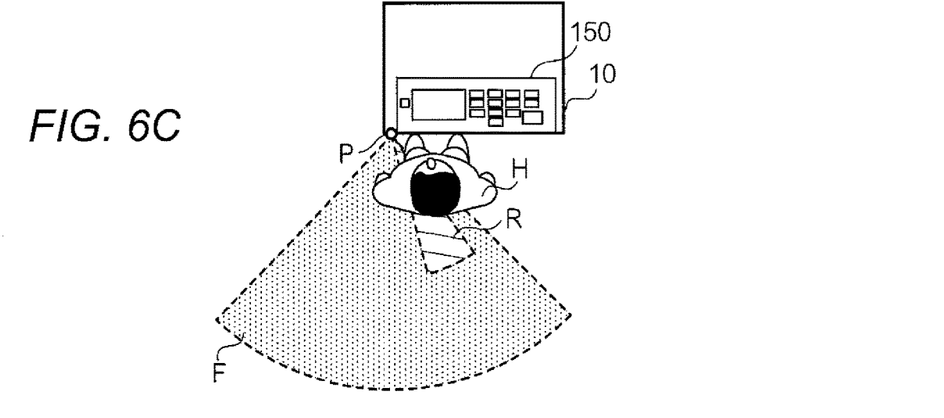

As illustrated in FIG. 6C, it is assumed that a person H (that is, a user) standing in front of the image forming apparatus 10 operates the operating unit 151 of the user interface 150 to instruct execution of the image forming process. In this case, the person H inputs authentication information such as an ID and a password and designates a storage location of PDL data used in the image forming process. Moreover, the user may designate the PDL data used for forming an image. Upon receiving the instruction to execute the image forming process according to the operation on the operating unit 151 input by the person H (step S101), the main controller 110 transitions the mode of the image forming apparatus 10 from the standby mode to the process execution mode.

The user authentication may be realized by other authentication method such as ID-card-based authentication or face-recognition-based authentication. The main controller 110 may specify the storage location based on an explicit indication of the storage location (for example, a file path) and may specify a storage location designated in advance for the user according to the authenticated user.

The main controller 110 transmits a list acquisition request for requesting acquisition of the process list to the storage device 20 based on the instruction received in step S101 (step S102). The list acquisition request includes a user ID for identifying the user, for example. The storage device 20 transmits the process list corresponding to the user ID to the image forming apparatus 10 (step S103). Moreover, the main controller 110 acquires the process list from the storage device 20.

Subsequently, the main controller 110 predicts the processing time of the forming process based on the communication speed of the communication line 50 and the respective items of information such as the data amount, the number of pages, and the color (color/monochrome) registered in the process list (step S104). When a process instructed by the user only among the processes instructed in the process list is executed, the main controller 110 predicts the processing time after the instruction is received.

Subsequently, the main controller 110 acquires temperature data obtained by measuring the temperature of the heat source 161A from the temperature sensor 161B (step S105). The temperature data indicates the present temperature of the heat source 161A. Subsequently, the main controller 110 specifies the ON timing of the heat source 161A based on the predicted processing time and the acquired temperature data (step S106). A method of specifying the ON timing will be described later.

Subsequently, the main controller 110 transmits a PDL data acquisition request for requesting acquisition of the PDL data to the storage device 20 (step S107). In this case, the main controller 110 may transmit data (for example, a file path) indicating the storage location to the storage device 20 and may transmit data for specifying the authenticated user. In the latter case, the storage device 20 specifies the storage location designated in advance for the user. Moreover, the main controller 110 acquires (receives) the PDL data transmitted from the storage device 20 according to the PDL data acquisition request via the communication unit 113 (step S108).

Subsequently, the main controller 110 starts a decomposing process based on the PDL data acquired from the storage device 20 (step S109). Moreover, the main controller 110 waits until the specified ON timing is reached (step S110). When the ON timing is reached, the main controller 110 turns the switching element 183 on so that the commercial power supply 30 is connected to the fixing unit power supply 186 to start the heating of the heat source 161A to thereby start the supply of electric power from the fixing unit power supply 186 to the heat source 161A (step S111). The main controller 110 acquires the temperature data from the temperature sensor 161B periodically (step S112) and waits until the temperature indicated by the temperature data reaches the fixing temperature (step S113). Moreover, when the temperature of the heat source 161A reaches the fixing temperature, the main controller 110 supplies raster data generated by the decomposing process to the image forming unit 160 and starts the forming process (steps S114 and S115). Further, the main controller 110 causes the fixing unit 161 to start the fixing process (step S116). The image forming unit 160 discharges a medium on which the fixing process has been performed.

Figure 8A:
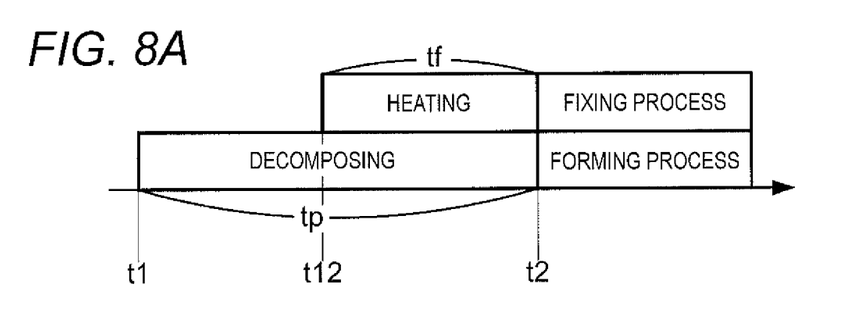
FIGS. 8A and 8B are diagrams illustrating the ON timings of a heat source in the image forming apparatus.
Figure 8B:
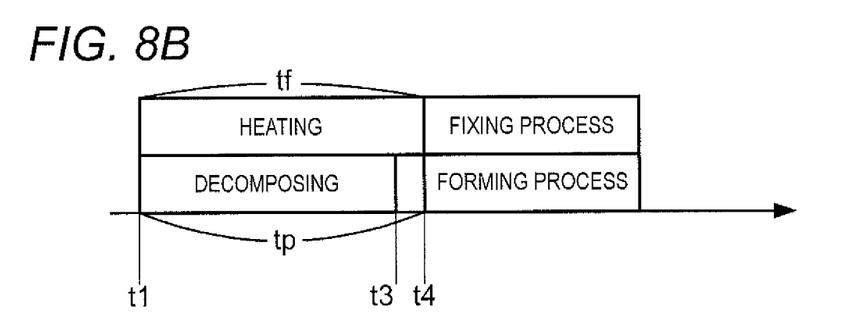

Here, a method of specifying the ON timing of the heat source 161A will be described with reference to FIGS. 8A and 8B. FIGS. 8A and 8B are diagrams illustrating the ON timing of the heat source 161A. With regard to specifying of the ON timing, it is assumed that the heating time which is the time required for heating the heat source 161A is specified (estimated) based on the fixing temperature and the present temperature of the heat source 161A.

First, as illustrated in FIG. 8A, a case in which the processing time tp is equal to or longer than the heating time tf will be considered. In this case, the main controller 110 specifies the ON timing of the heat source 161A so that the starting time point of the decomposing is identical to the ending time point of heating of the heat source 161A. When the starting time point of the decomposing is "t1" and the ending time point thereof is "t2," the main controller 110 specifies a time point t12 (=t2−tf) which is a subtraction of the heating time tf from the ending time point t2 as the ON timing of the heat source 161A.

Next, as illustrated in FIG. 8B, a case in which the processing time tp is shorter than the heating time tf will be considered. In this case, the main controller 110 specifies the present time as the ON timing of the heat source 161A. For example, when the processing amount of the image forming process is small, for example, the processing time may be short. In such a case, the main controller 110 specifies the starting time point "t1" of the decomposing as the ON timing of the heat source 161A. In this way, at a certain time point "t4" later than the ending time point "t3" of the decomposing, heating of the heat source 161A ends. In this case, the main controller 110 starts the forming process when the temperature of the heat source 161A reaches the fixing temperature, for example.

Hereinabove, the image forming process has been described.

The description is continued by returning to FIG. 5.

In the image forming apparatus 10, when the image forming process is completed, the mode transitions from the process execution mode to the standby mode. In this case, the main controller 110 may control the switching element 183 so as to interrupt the supply of electric power from the fixing unit power supply 186.

Figure 9:
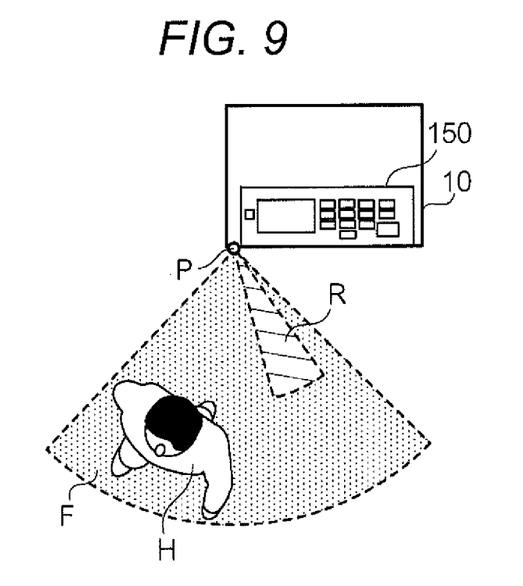
FIG. 9 is a diagram illustrating the change in the position of a person present around the image forming apparatus.

Subsequently, as illustrated in FIG. 9, a case in which the person H exits the second detection range R because the person has finished using the image forming apparatus 10 will be considered. In this case, the reflection sensor 140 supplies a non-detection signal indicating that the presence of the person H is not detected due to the exiting to the power controller 120 (step S21). When the non-detection signal is supplied from the reflection sensor 140, the main controller 110 supplies a transition instruction signal for instructing the transition to the sleep mode to the user interface 150 and the image forming unit 160 after the elapse of a predetermined period such as a sleep transition period (steps S22 and S23). In response to the transition instruction signal, the user interface 150 and the image forming unit 160 stop their operation. With this process, the image forming apparatus 10 transitions from the standby mode to the sleep mode.

Subsequently, the main controller 110 supplies a transition instruction signal for instructing the transition to the sleep mode to the power controller 120 (step S24). When the transition instruction signal is supplied, the power controller 120 turns the switching element 183 off so that the commercial power supply 30 is disconnected from the second low-voltage power supply 185 (step S25). With the process of step S25, the second low-voltage power supply 185 interrupts the supply of electric power to the user interface 150 and the image forming unit 160. With the processes of steps S22 to S25, the image forming apparatus 10 transitions from the standby mode to the sleep mode.

Subsequently, the power controller 120 supplies a start instruction signal for causing the power storage device 170 to start the supply of electric power to the power storage device 170 (step S26). When the start instruction signal is supplied, the power storage device 170 starts supplying electric power to the power controller 120, a portion of the main controller 110, and the pyroelectric sensor 130.

Subsequently, the power controller 120 turns the switching element 183 off so that the commercial power supply 30 is disconnected from the first low-voltage power supply 184 (step S27). The process of step S27 may be performed after the start of the supply of electric power by the power storage device 170 is checked and may be performed after a predetermined period has elapsed from the process of step S26.

Moreover, the first low-voltage power supply 184 stops the supply of electric power to the main controller 110, the power controller 120, and the reflection sensor 140. Thus, the image forming apparatus 10 transitions from the sleep mode to the sleep-zero mode. The reflection sensor 140 may be configured so that the supply of electric power thereto is stopped by a switching element such as the power controller 120.

As described above, the image forming apparatus 10 predicts the processing time of the forming process and starts the heating of the heat source 161A so that the temperature of the heat source 161A reaches the fixing temperature at least by the starting time point of the fixing process. Thus, the power consumed by the heat source 161A is zero or substantially zero in a period in which the fixing process is not executed such as a period in which the image forming apparatus 10 acquires PDL data from the storage device 20 or a period in which the image forming apparatus 10 generates the raster data from the PDL data. According to the image forming apparatus 10, the power consumption in the standby period until the execution of the fixing process starts is reduced as compared to a case in which heating of the heat source 161A starts when the mode changes, for example.

The invention may be embodied in different forms from the above-described exemplary embodiment. Moreover, the modifications illustrated below may be combined with each other.

When the processing time is equal to or longer than the heating time, the main controller 110 may set the ON timing of the heat source 161A to timing other than the timing at which the starting time point of the forming process is identical to the ending time point of the heating of the heat source 161A. The main controller 110 may delay the starting timing of the heating of the heat source 161A in relation to the timing to transition to the process execution mode so that the temperature of the heat source 161A reaches the fixing temperature at least until the fixing process starts.

The image forming apparatus 10 may specify the heating time without using the temperature data. In this case, since the ON timing of the heat source 161A is specified according to the processing time, the power consumption in the standby state until execution of the fixing process starts is reduced as compared to a case in which the heating of the heat source 161A starts when the mode changes.

Moreover, the image forming apparatus 10 may acquire raster data rather than PDL data from the storage device 20 and the specific format of the image data is not particularly limited.

Moreover, the image forming apparatus 10 may not have a configuration for acquiring the process list. In this case, the image forming apparatus 10 may predict the processing time based on information described in the header of the PDL data.

The hardware configuration and the functional configuration of the image forming apparatus 10 described hereinabove are examples only.

Moreover, the image forming apparatus 10 may not include the power storage device 170. For example, the image forming apparatus 10 may operate by receiving the supply of electric power from a photovoltaic panel in the sleep-zero mode. Moreover, the power storage device 170 may be charged from a photovoltaic panel instead of being charged by the low-voltage power supply and the like. The image forming apparatus 10 may operate by receiving the supply of electric power from another power storage device (for example, a power storage device having a larger capacity than the power storage device 170) different from the power storage device 170 rather than the commercial power supply 30 in the standby mode and the process execution mode.

The type and the number of modes in the above-described exemplary embodiment are examples only. Moreover, the above-described sensor is an example only and sensors of other types may be used. For example, an image capturing element for use of recognizing the user based on an image recognition method may be used instead of the reflection sensor 140.

Moreover, the switching from the sleep-zero mode to the standby mode may be realized according to conditions (for example, an operation of an energy-saving release button) other than the approach of a person to the image forming apparatus 10.

In the above-described exemplary embodiment, although the image forming apparatus 10 is a console-type apparatus, the image forming apparatus 10 may be a desktop apparatus, for example.

The information processing apparatus of the invention may be an information processing apparatus other than the image forming apparatus, and, for example, may be an information processing apparatus such as a scanner, a copier, or a facsimile and may be an information processing apparatus such as a personal computer or a server apparatus.

The respective functions realized by the image forming apparatus 10 of the above-described exemplary embodiments may be realized by one or plural hardware circuits, may be realized by an arithmetic device executing one or plural programs, or may be realized by a combination thereof. When the functions of the image forming apparatus 10 are realized using a program, the program may be provided in the state of being stored in a computer readable recording medium such as a magnetic recording medium (a magnetic tape, a magnetic disk (a hard disk drive (HDD) or a flexible disk (FD)) or the like), an optical recording medium (an optical disc or the like), a magneto-optical recording medium, or a semiconductor memory, or may be delivered via a network. Further, the invention may also be understood as an image forming apparatus control method performed by a computer.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
a communication unit that receives supply of electric power corresponding to a first mode to perform communication via a communication line;
an image forming unit that receives supply of electric power corresponding to the first mode to form an image, corresponding to image data acquired via the communication line, on a medium;
a fixing unit that comprises a heat source that generates heat by receiving supply of electric power corresponding to the first mode, and performs a fixing process of fixing the image to the medium using the heat generated by the heat source;
a predicting unit that predicts a processing time required for a process of forming the image; and
a supply controller that controls supply of electric power in an own apparatus according to the first mode or a second mode in which power consumption is smaller than that of the first mode, the supply controller starting the supply of electric power corresponding to the first mode to the heat source at a timing based on the predicted processing time when the image forming apparatus transitions from the second mode to the first mode.

2. The image forming apparatus according to claim 1, further comprising:
a temperature measurement unit that measures temperature of the heat source,
wherein the supply controller starts the supply of electric power corresponding to the first mode to the heat source at a timing based on the measured temperature and the processing time.

3. The image forming apparatus according to claim 1, wherein when the processing time is longer than a period taken until temperature of the heat source reaches a predetermined temperature, the supply controller starts the supply of electric power corresponding to the first mode to the image forming unit and then starts the supply of electric power corresponding to the first mode to the heat source at a timing at which the temperature of the heat source reaches the predetermined temperature at least until the fixing process starts.

4. The image forming apparatus according to claim 1, further comprising:
a list acquiring unit that acquires a list indicating processes for forming the image,
wherein the predicting unit predicts the processing time based on the acquired list.

5. A method for controlling an image forming apparatus, the image forming apparatus comprising:
a communication unit that receives supply of electric power corresponding to a first mode to perform communication via a communication line;
an image forming unit that receives supply of electric power corresponding to the first mode to form an image, corresponding to image data acquired via the communication line, on a medium; and
a fixing unit that comprises a heat source that generates heat by receiving supply of electric power corresponding to the first mode, and performs a fixing process of fixing the image to the medium using the heat generated by the heat source,
the method comprising:
predicting a processing time required for a process of forming the image; and
controlling supply of electric power in an own apparatus according to the first mode or a second mode in which power consumption is smaller than that of the first mode, the controlling involving starting the supply of electric power corresponding to the first mode to the heat source at a timing based on the predicted processing time when the image forming apparatus transitions from the second mode to the first mode.

6. A non-transitory computer readable medium storing a program causing a computer of an image forming apparatus to execute a process for controlling the image forming apparatus, the image forming apparatus comprising:
a communication unit that receives supply of electric power corresponding to a first mode to perform communication via a communication line;
an image forming unit that receives supply of electric power corresponding to the first mode to form an image corresponding to image data acquired via the communication line on a medium; and
a fixing unit that comprises a heat source that generates heat by receiving supply of electric power corresponding to the first mode, and performs a fixing process of fixing the image to the medium using the heat generated by the heat source,
the process comprising:
predicting a processing time required for a process of forming the image; and
controlling supply of electric power in an own apparatus according to the first mode or a second mode in which power consumption is smaller than that of the first mode, the controlling involving starting the supply of electric power corresponding to the first mode to the heat source at a timing based on the predicted processing time when the image forming apparatus transitions from the second mode to the first mode.

* * * * *